United States Patent [19]

Agnew et al.

[11] Patent Number: 4,884,218

[45] Date of Patent: Nov. 28, 1989

[54] KNOWLEDGE SYSTEM WITH IMPROVED REQUEST PROCESSING

[75] Inventors: Palmer W. Agnew, Owego; Neil H. Clayton, Apalachin; Monroe Judkovics, Endwell, all of N.Y.; Jose L. Rivero, Boca Raton, Fla.; Kuo-chang Sun, Endicott, N.Y.

[73] Assignee: International Business Machines Corporation, Armonk, N.Y.

[21] Appl. No.: 103,810

[22] Filed: Oct. 1, 1987

[51] Int. Cl.$^4$ .............................................. G06F 15/00
[52] U.S. Cl. ..................................... 364/513; 364/300
[58] Field of Search ................................. 364/513, 300

[56] References Cited

U.S. PATENT DOCUMENTS

| | | | |
|---|---|---|---|
| 4,128,891 | 12/1978 | Lin et al. | 364/900 |
| 4,221,003 | 9/1980 | Chang et al. | 364/900 |
| 4,591,983 | 5/1986 | Bennet | 364/403 |
| 4,606,002 | 8/1986 | Waisman et al. | 364/200 |
| 4,620,286 | 10/1986 | Smith et al. | 364/513 |
| 4,636,974 | 1/1987 | Griffin | 364/900 |
| 4,644,471 | 2/1987 | Kojima et al. | 364/300 |
| 4,648,044 | 3/1987 | Hardy et al. | 364/513 |
| 4,658,370 | 4/1987 | Erman et al. | 364/513 |
| 4,675,829 | 6/1987 | Clemenson | 364/513 |
| 4,704,695 | 11/1987 | Kimura et al. | 364/513 |
| 4,763,277 | 8/1988 | Ashford et al. | 364/513 |

OTHER PUBLICATIONS

IBM Techincal Disclosure Bulletin, vol. 24, No. 7A, Dec. 1981, "Accomodation of Variable-Length Records in a Collection of Bubble Chips", by H. Chang.
IBM Technial Disclosure Bulletin, vol. 28, No. 8, Jan. 1986, "Method for Transferring Collected Data Between Rulebases of Expert Systems", by Benignus et al.
The Office, vol. 104, No. 5, (1986), p. 116, "Managing the Records of a Nuclear Utility".
The First Conference on Artificial Intelligence Applications, (1984), pp. 86-91, "An Expert System for Evaluating Electronic Warfare Tasking Plans for the Royal Navy", by J. A. Gadsden.
IEEE Transactions on Software Engineering, vol. SE-11, No. 7, Jul. 1985, "Gambit: An Interactive Database Design Tool for Data Structures, Integrity Constraints, and Transactions", by Braegger et al.
IBM Technical Disclosure Bulletin, vol. 29, No. 10, Mar. 1987, "Predictive Search Mechanism", by K. S. Natarajan.
IBM Technical Disclosure Bulletin, vol. 27, No. 12, May 1985, "Invoking Inference Engines in an Expert System", by Aikins et al.
IBM Technical Disclosure Bulletin, vol. 16, No. 12, May 1974, "Retrieval Ugorithm for Relational Data Bases".

Primary Examiner—A. D. Pellinen
Assistant Examiner—H. L. Williams
Attorney, Agent, or Firm—Scully, Scott, Murphy & Presser

[57] ABSTRACT

A knowledge system including an expert system and a complementary data base. The knowledge system is provided to answer requests, and each request has a record including a plurality of parameters and values for those parameters. The expert system is provided to process the record of a specific request to answer that request, and the complementary database stores a plurality of records of requests having known answers, and any request from a user is preprocessed by searching the complementary database for a record identical to the record of the request. If an identical record is found, the known answer to the request having that identical record is given to the user to answer his or her request; however if no identical record is found in the complementary database, the expert system is invoked to answer the request.

14 Claims, 7 Drawing Sheets

KNOWLEDGE SYSTEM WITH IMPROVED REQUEST PROCESSING

BACKGROUND OF THE INVENTION

This invention generally relates to knowledge systems, and more particularly to a knowledge system having a complementary database to support problem solving.

Knowledge systems are computer systems that emulate human reasoning by interpreting encoded knowledge of human experts stored in a database referred to as a knowledge base. If the domain of the knowledge base, or the scope of the problem, is sufficiently narrow and an adequately large body of knowledge is properly coded in the knowledge base, then the knowledge system can achieve performance matching or exceeding the ability of a human expert. In such a case, the knowledge system is referred to as an expert system. Expert systems may be designed, at least in theory, for virtually any application ranging from medical diagnosis, automobile repair consultation, inventory control, and many other uses.

One difficult step in developing expert systems is to encode unstructured, often even unarticulated knowledge into a machine readable form. The encoding process is done by a person, known as a knowledge engineer, who must be highly skilled at both obtaining knowledge from a human expert and also translating that knowledge into a machine readable expert system language.

Another difficulty with expert systems is that, for many specific queries, they are more expensive and slower than is necessary. To elaborate, an expert system may be invoked to answer a request involving a large number of variables, and the expert system may process those variables through a relatively complicated program to answer the request. For many requests, especially those that are unique or complicated, this processing may be needed to answer the requests reliably. However, many requests are relatively standard or conventional, and invoking the complicated, time consuming processing of the expert system is a relatively slow and expensive way to answer these requests.

For instance, a customer may purchase an IBM 9370 Information System with many variable or optional features such as different memory sizes, different numbers of tape drives, and different direct access storage devices. In fact, it has been estimated that over two billion different combinations of features are available with the 9370 Information System. This very large number of different configurations of the 9370 Information System precludes developing a data base that contains all valid configurations—that is, all configurations that can be built without violating any of certain rules or limitations set by the manufacturer.

To solve this problem, an expert system was developed to configure a complete system based on a customer's requested machine configuration. The resultant expert system configurator adds features that are implied by the features that the customer actually specified as part of the requested machine configuration. For example, the expert system configurator adds enough DASD/Tape Controller Cards to control the number of DASD devices and Tape devices specified by the customer. The configurator also adds enough racks to physically contain the processor, the DASD devices, and the tape devices. To perform its function, the configurator actually determines where to place each card in a card cage and determines where to place each box in a rack. This is necessary in order to determine how many card cages are necessary and how many racks are necessary. The configurator also checks the resultant fully configured system against limits, to be sure that the system can be manufactured.

Various 9370 systems have become somewhat standard or common, though, and considerable time and expense could be saved if the expert system were supplemented to avoid invoking that expert system to process a request for one of those standard or conventional systems.

SUMMARY OF THE INVENTION

An object of this invention is to provide a complementary database, and supporting programs, to support problem solving by an expert system.

Another object of the present invention is to eliminate the need to invoke an expert system to process certain standard or conventional requests, or requests that the system had previously been used to process.

A further object of this invention is to combine an expert system with a database, preferably a relational database, that contains answers which were previously determined by the expert system so that both overall system response time and central processing utilization are reduced.

A further object of this invention is to use an expert system to determine valid, full machine configurations; and whenever a machine configuration is determined for the first time to be a valid, full configuration, to add a record of that configuration to a complementary database so that it is unnecessary to again invoke the expert system to determine if that particular machine configuration is valid.

These and other objectives are attained with a knowledge system including an expert system and a complementary database. Generally, the system is provided to answer requests, and each request has a record including a plurality of parameters and values for those parameters. The expert system is provided to process the record of a specific request to answer that request, and the complementary database stores a plurality of records of requests having known answers, and any request from a user is preprocessed by searching the complementary database for a record identical to the record of the request. If an identical record is found, the known answer to the request having that identical record is given to the user to answer his or her request; however, if no identical record is found in the complementary database, the expert system is invoked to answer the request.

Preferably, the complementary database has the capacity to be continuously updated by adding new records to it from the expert system. With this capability, if a request is made having a particular record that is not found in the complementary database, and the expert system is invoked to answer that request, then a record of the answer produced by the expert system may be added to the complementary database. In this way, if a later request is made having a record the same as that of the added record, it is not necessary to again invoke the expert system to answer the request.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
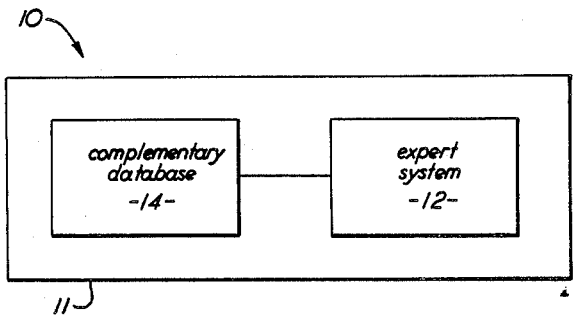
FIG. 1 is a block diagram illustrating a system according to the present invention.

With reference to FIG. 1, the present invention is a knowledge system 10 comprising a central processing unit 11 including an expert system 12 and a complementary database 14. Generally, the knowledge system is provided to answer requests, and each request has a record including a plurality of parameters, taken from a given family of parameters, and values for those plurality of parameters. The expert system is provided to process the record of a specific request, according to a given program, to provide an answer to that request, and the complementary database stores a plurality of records of requests having known answers, and any request from a user is preprocessed by searching the complementary database for a record identical to the record of the request. If an identical record is found in the complementary database, the known answer to the request having that identical record is given to the user to answer his or her request, eliminating the need to invoke the expert system to process the user request, with concomitant savings in time and cost. However, if no identical record is found in the complementary database, the expert system is invoked to answer the request.

Preferably, complementary database 14 has the capacity to be continuously updated by adding new records to it from expert system 12. With this capability, if a request is made having a particular record that is not found in the complementary database, and the expert system is invoked to answer the request, then a record of this answer, which may or may not be identical to the request record, may be added to the complementary database. In this way, if a later request is made having a record the same as that added record, it is not necessary to again invoke the expert system to answer the request.

For example, system 10 may be used to determine whether a requested machine or system configuration is valid—that is, the machine configuration can be built without violating any of certain rules or limitations set by the manufacturer. In this case, the given family of parameters may include all the available types of features and options, as well as a parameter to identify a basic machine name or number and a parameter to identify a basic model name or number, and the value for a parameter is a specific choice or selection relating to that parameter. The record for a particular request includes a machine name or number, a model name or number, and a name or term for, or associated with, each type of feature or option that a person wants on the system, and a specific choice or selection relating to each of those desired features or options.

Even more specifically, system 10 may be used to configure a particular IBM 9370 computer system, and in this event, the parameters of a machine record might include terms or phrases such as machine, model, memory size, direct access storage device (Dasd), tape drives, and rack size. Four types of machines are available: the Processor 10, the Processor 11, the Processor 12 and the Processor 14; and each of these machines is available in one model—the Processor 10 is available in model No. 9373-20, the Processor 11 is available in model No. 9375-40, the Processor 12 is available in model No. 9375-60, and the Processor 14 is available in model No. 9377-90. Three memory sizes are available: 4 megabytes, 8 megabytes, and 16 megabytes; two types of direct access storage devices are available: DASD-A and DASD-B; and two different sizes of racks are available: 1.6 m. and 1.3 m.

A record for a 9370 computer system might include the following data:

| | |
|---|---|
| Machine: | Proc 10 |
| Model: | 9373 |
| Memory: | 8MB |
| DASD-A | 2 |
| DASD-B | 13 |
| : | : |
| : | : |
| Tape drives: | 2 |
| Rack size | 1.6 m |

The complete records of several popular or standard system configurations may be stored in the complementary database; and when a request is made having a record identical to one of these stored records, the fact that an identical record is stored in the complementary database indicates that the machine or system configuration is valid, and it is not necessary to invoke the expert system to process the request. With the capacity to continuously update the complementary database, if a request is made for a machine configuration, and the record for that configuration is not in the complementary database but the expert system successfully computes a valid configuration from that request, then the record for this computed machine configuration can be added to the complementary database, eliminating any need to use the expert system again to compute that configuration.

Figure 2:
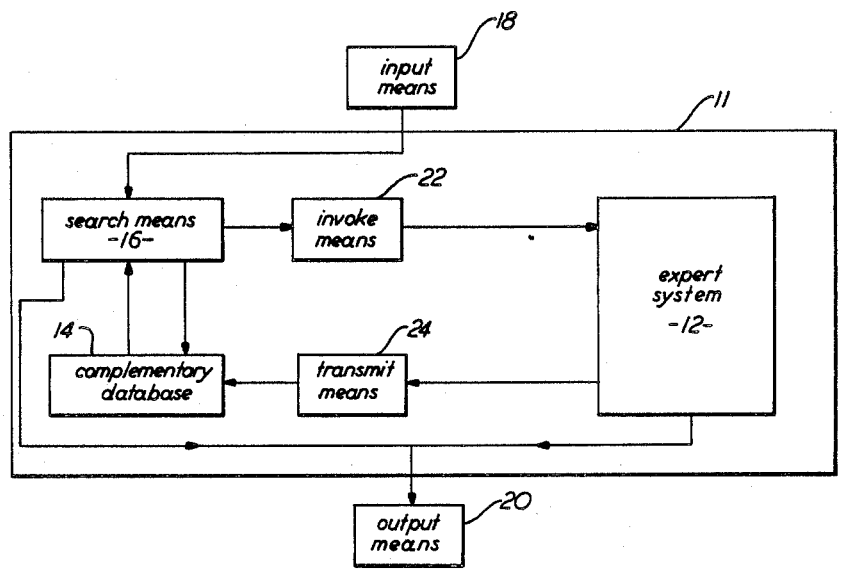
FIG. 2 is a more detailed block diagram showing the system of FIG. 1.

FIG. 2 illustrates knowledge system 10 in greater detail; and, as shown therein, the system further includes search means 16, input means 18, output means 20, invoke means 22 and transmit means 24. The search means is connected to the complementary database to search that database for a record identical to the record of a request, and if such an identical record is found, to provide an answer to the request. The input means is connected to the search means and is provided to receive from a user, the record of a request and to transmit that record to the search means. The output means is connected both to the search means and to the expert system to receive the answer to a request, either from the search means or from the expert system, and to convey that answer to the requestor.

The invoke means is connected to the search means and to the expert system to invoke that expert system to process the record of a request whenever, and preferably only when, no identical record has been found in the complementary database. The transmit means is connected to the complementary database and to the expert system, and the transmit means is used to transmit to the complementary database for storage therein, all or selected records that have been processed by the expert system.

Figure 3:
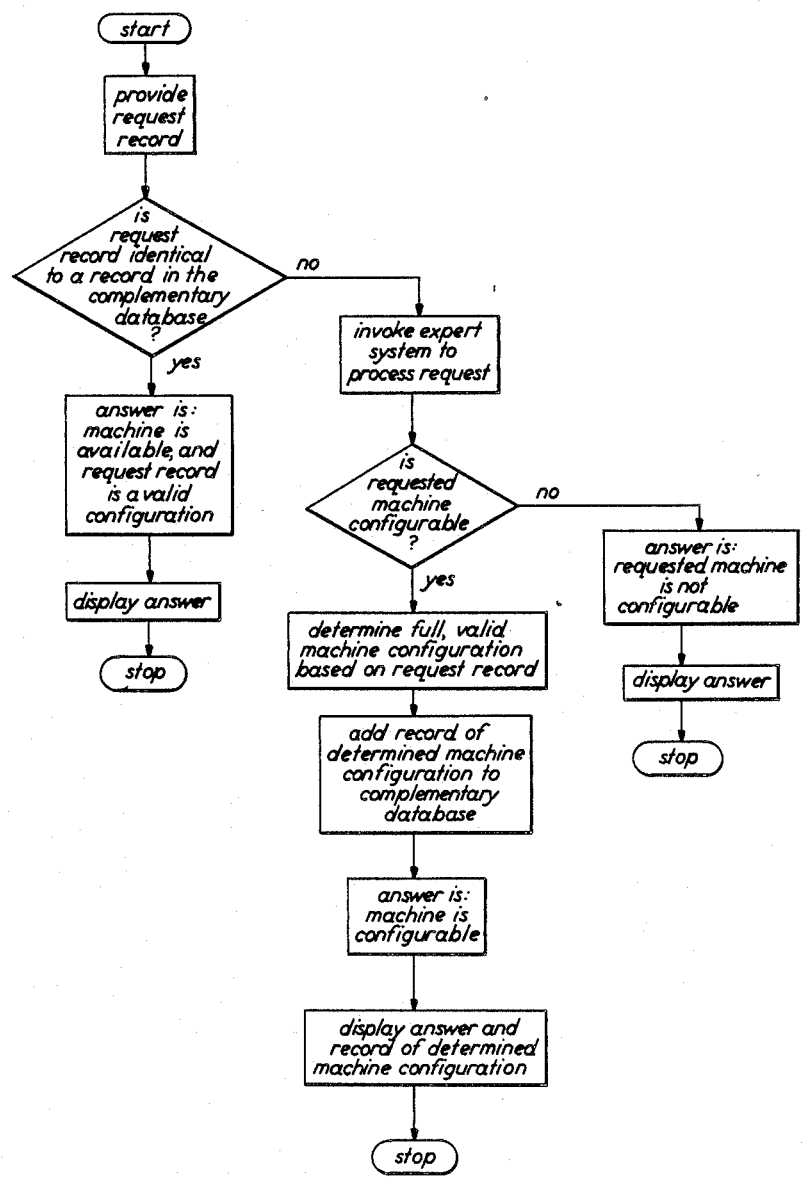
FIG. 3 is a simplified flow chart showing one process for operating a knowledge system according to this invention.

FIG. 3 is a flow chart illustrating one procedure for operating system 10. With this procedure, the record for a requested machine configuration is provided, and the complementary database is searched for an identical record. If such an identical record is found, the answer to the inquiry is that the requested machine configuration is valid, and this answer is conveyed to the requestor. If the identical record is not found in the complementary database, the expert system is invoked to compute a full, valid machine configuration based on the requested configuration. If the requested configuration is computable, this answer is conveyed to the requestor, and the record of the computed configuration, which might be the same as or different than the requested machine configuration, is added to the complementary database. If the request is not configurable, this answer is conveyed to the requestor.

Figure 4:
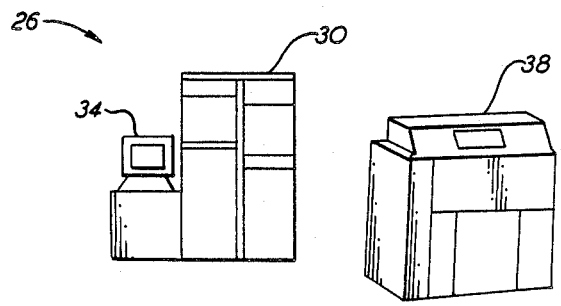
FIG. 4 shows a computer system that may be used as the knowledge system of this invention.

FIG. 4 illustrates a computer system 26 that may be used to practice the present invention. The computer 26 is of conventional construction and has a central processing unit 30 including a processor and a random access memory along with one or more disc or tape drives for receiving computer programs and data to be executed and processed by the processor. To run a program, for example, a tape may be mounted on the main unit 30. In order for the user to interact with the computer while a program is being run, the computer includes a cathode ray tube display 34 for showing the user intermediate results and prompting the user for data to be entered via suitable input means. A printer 38 is also provided to produce a permanent record or listing of data when a computer program is run. A portion of the memory of the computer may be used to house the complementary database of this invention. Alternatively, the complementary database may comprise a separate data storage unit, located inside or outside of the computer.

An expert system may be defined as a system that is capable of accepting input that describes a real world situation, accessing a knowledge base, usually represented in terms of rules, and processing the knowledge base by means of an inference engine to generate an answer that approximates the answer a human expert would give in the same real world situation. As previously mentioned, knowledge system 10 may be used with an expert system specifically designed to determine particular machine configurations, and any suitable such system may be used in the practice of this invention. One system used by IBM to compute particular configurations of the IBM 9370 Information System is known as the HP&CS—the Hardware Placement and Connection System—which is part of a larger system, referred to as HONE, that is also used to track and process order requests.

Furthermore, those of ordinary skill in the art will recognize that many other types of expert systems may also be employed with knowledge system 10. For example, U.S. Pat. No. 4,658,370 discloses an expert system that gives car repair advice, and U.S. Pat. No. 4,648,044 discloses an expert system for selecting wines, and the present invention may be effectively employed with both of these expert systems.

In addition, any suitable complementary database and any suitable procedure for searching that database for a particular record may be used in the practice of the present invention, although preferably the complementary database is a relational database. FIGS. 5–9 illustrate a preferred database table design and a preferred searching technique that have been developed for use in the present invention and which are particularly advantageous when the expert system involves a large number of data items.

Figure 5:
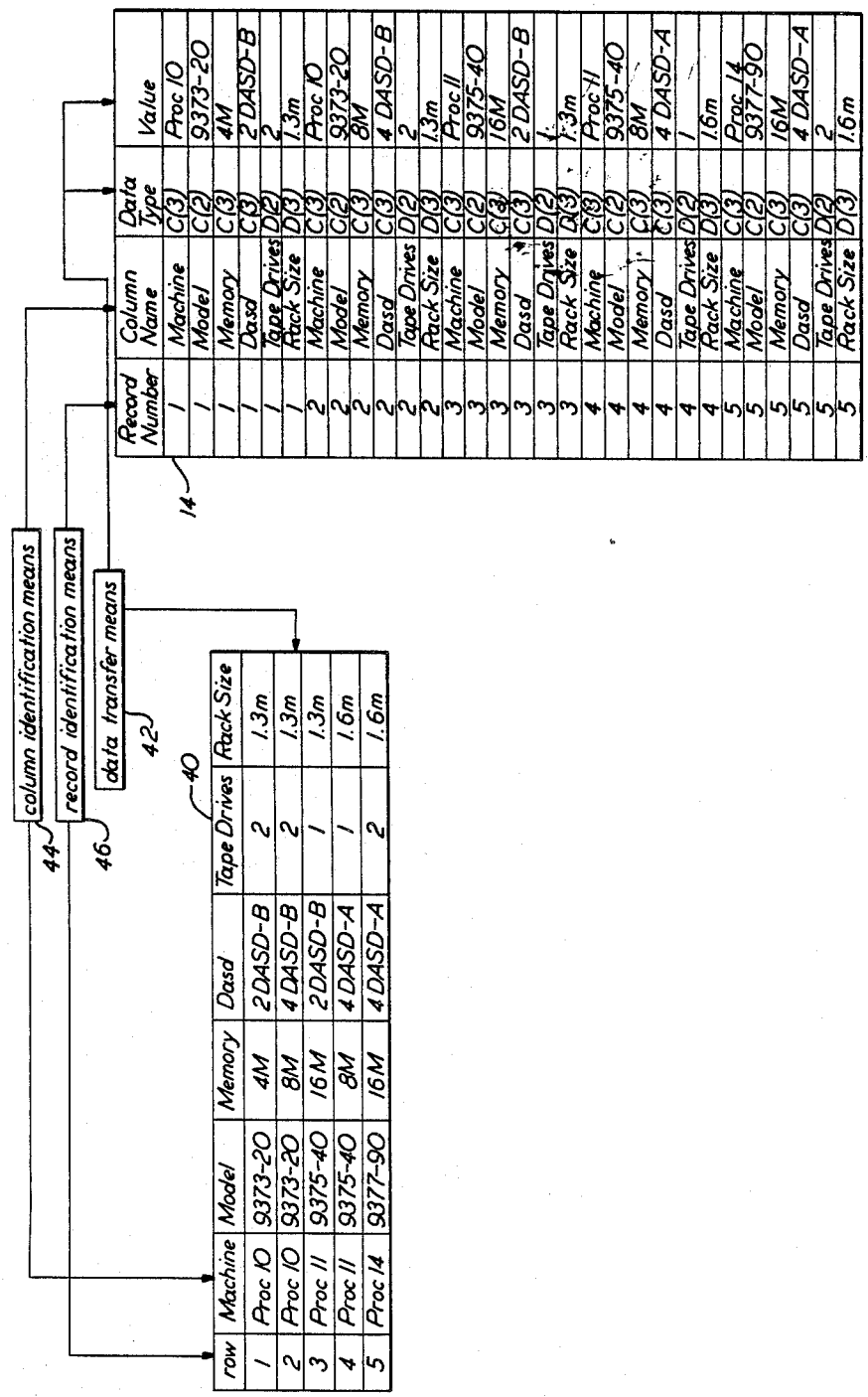
FIG. 5 illustrates a system for transferring data from a conventional database table to the type of database table used in the system of FIG. 1.

Database table 14 is preferably obtained by transferring data from a conventional database table, shown at 40 in FIG. 5 to database table 14. Database table 40 has a plurality of rows and columns, each column has a name, and each row is identified by a unique number. Each row of table 40 comprises a set of data items referred to as a record, and each record in the table is thus uniquely identified by the number identifying the row of data forming the record. For this reason, the numbers identifying the rows of table 40 are referred to as record numbers. Preferably, the rows of table 40 are consecutively numbered with consecutive integers, starting with 1. Database table 14 has a plurality of rows and at least three, and preferably four, columns; and the columns of this table are designated "Record Number," "Column Name," "Data Type" and "Value."

Data value transfer means 42 is provided to transfer each data item in database table 40 to the Value column of database table 14. Generally, the data in each row of table 40 are transferred to successive rows of the Value column of table 14, and data from successive rows of table 40 are transferred to successive series of rows in the Value column of table 14. For instance, the six data items in the first row of table 40 are transferred to rows 1 through 6, respectively, of the Value column of table 14, and the six data items in the second row of table 40 are transferred to rows 7–12, respectively, of the Value column of database 14. The six data items in the third row of table 40 are transferred to rows 13–18, respectively, of the Value column of table 14, and the remaining data items in table 40 are transferred in an analogous manner to the Value column of table 14.

It is often desirable to represent all the data items in each individual column of a database table in a single format such as alpha-numeric or numeric. For this reason, as data items are being transferred from table 40 to table 14, it may be preferred to convert the data items into a code having one format for alpha characters, whole numbers and decimals, and data transfer means 42 may be used to do this. If this is done, the data value transfer means may also be used to identify in each row of the Data Type column of table 14, the original format in table 40 of the data item stored in the Value column of that row of table 14. For instance, C(3) may be placed in rows 1, 7 and 13 of the Data Type column of table 14 because the data items in rows 1, 7 and 13 of the Value column of table 14 are stored in alphanumeric format in table 40, and D(2) may be placed in rows 5, 11 and 17 of the Data Type column of table 14 because the data items in rows 5, 11 and 17 of table 14 are given in a numeric format in table 40. In this way, the data items in table 14 can be converted back into their original code and format if desired, and for example, this may be done to use these data items in a mathematical computation.

Column identification means 44 is provided to identify in the Column Name column of each row of table 14, the title or name of the column of table 40 from which the data item in the Value column of that row was taken. For example, the title "Machine" is placed in the Column Name column of the first row of table 14 because the data item Proc 10 in the Value column of the first row of this table is taken from the "Machine" column of table 40; and the title "Model" is placed in the Column Name column of the second row of table 14 because the data item 9373-20, in the Value column of the second row of this table is taken from the "Model" column of table 40.

For analogous reasons, the terms "Memory," "Dasd," "Tape Drives" and "Rack Size" are located, respectively, in the third through sixth rows of the Column Name column of table 14. The names "Machine," "Model, "Memory," "Dasd," "Tape Drives" and "Rack Size" are repeated, respectively, in rows 7–12 of the Column Name column of table 14 because the data items in rows 7–12 of the Value column of the table were taken, respectively, from the "Machine" "Model," "Memory," "Dasd," "Tape Drives" and "Rack Size" columns of table 40.

Record identification means 46 is provided to identify in the Record Number column of each row of database table 14, the number of the row, or record, of database table 40 from which the data item in the Value column of that row of table 14 was taken. For instance, the number "1" is placed in each of rows 1–6 of the Record Number column of table 14 because each of the data items in rows 1–6 of the Value column of this table is taken from the first row of table 40, and the number "2" is located in each of rows 7–12 of the Record Number column of table 14 because each of the data items in rows 7–12 of the Value column of this table is taken from the second row of table 40. For analogous reasons, the number "3" is located in each of rows 13–18 of the Record Number column of table 14, the number "4" is located in each of rows 19–24 of the Record Number column of this table, and the number "5" is located in each of rows 25–30 of the Record Number column of the table.

Figure 6:
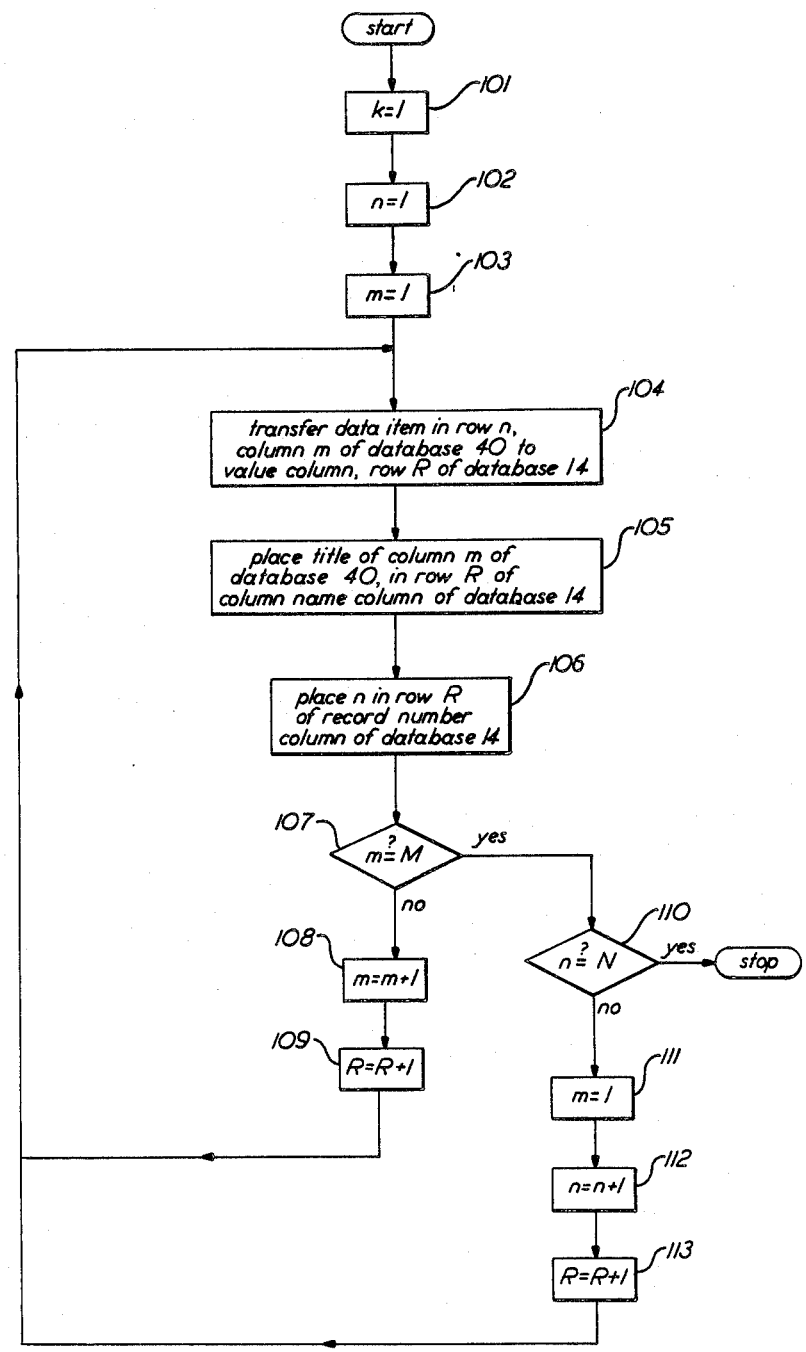
FIG. 6 is a flow chart illustrating a procedure for operating the system shown in FIG. 5.

With particular reference to FIG. 6, the program outlined therein for transferring data from database table 40 to database table 14 involves three variables, k, n and m, and two constants M and N. k is an internal counting variable that keeps track of the number of data items that have been transferred from table 40 to table 14, and m and n are internal variables that identify the column and row, respectively, of a data item being transferred from table 40 to table 14. M and N are externally set values equal to the total number of columns and rows, respectively, in table 40.

At steps 101, 102 and 103 in the program represented by FIG. 6, k, n, and m are respectively set equal to one, and at step 104 the data item in row n, Column m of table 40 is transferred to row k of the Value column of table 14. Then at step 105, the title of column m of table 40 is placed in row k of the Column Name column of table 14, and step 106 the number n is placed in row k of the Record Number column of this table. Next, at step 107 m is compared to M, and if m is unequal to M, m and k are increased by one at steps 108 and 109 respectively, and the program loops back to step 104. Steps 104–109 are repeated for successively larger m values until m is equal to M. When this occurs, from step 107, the program moves to step 110, and n is compared to N. If n is unequal to N, m is reset to one at step 111, n and k are increased by one at steps 112 and 113 respectively, and the program returns to step 104. Steps 104–109 are repeated, for this new value of n, until the new m becomes equal to M, and when this occurs, n and k are again increased by one and m is again reset to one. This procedure continues until n is found to be equal to N at step 110; and when this occurs, the program terminates.

With the above-described program, the data items in database table 40 are transferred one row, or record, at a time to database table 14. Within each row in table 40, the data items in successive columns of the row are transferred to successive rows of the value column of table 14, and the data items in successive rows of table 40 are transferred to successive sets or groups of rows in table 14.

Figure 7:
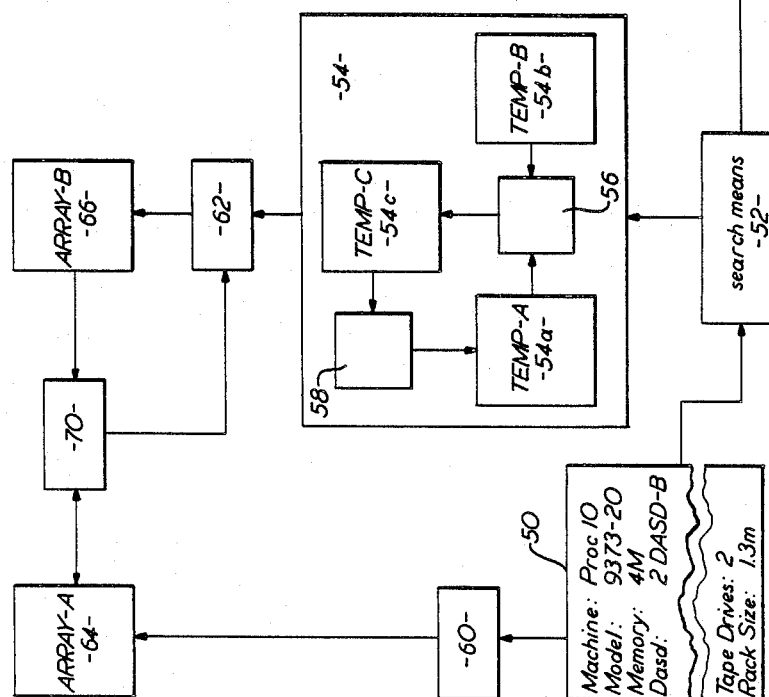
FIG. 7 schematically illustrates a system for searching the complementary database shown in FIG. 1, for a given record.

FIG. 7 shows a system for searching table 14 for a given record. With this system, input means 50 is provided to receive an inquiry having a record, referred to as the given record, which includes a plurality of parameters taken from a given family of parameters, and a value for each parameter in the record. It is not necessary, however, that the given record include all of the parameters in the given family. Search means 52 is provided to search table 14 for the numbers of the records having a first of the parameters of the given record and also having the same value for that first parameter as in the given record. If any such records are stored in table 14, search means 52 retrieves the numbers of those records and stores those record numbers in memory 54. For each of the other, or succeeding, parameters of the given record, search means 52 searches through table 14 for the numbers of the records having that other parameter of the given record and the same value for that other parameter as in the given record; and the list of the numbers in memory 54 is modified by deleting from that list, first, the numbers of the records not having the other parameter, and second, the numbers of the records having the other parameter but having a value for that other parameter different than the value of that other parameter in the given record.

This deletion or elimination of some or all of the numbers in memory 54 is achieved by means of memory sections 54 a, b and c, referred to as TEMP-A, TEMP-B and TEMP-C respectively. More specifically, the numbers of the records having both the first parameter of the given record and the same value for that parameter as in the given record, are stored in TEMP-A. After table 14 has been searched for all of the records having that first parameter and given value for that parameter, search means 52 then searches through the table for the numbers of the records having a second of the parameters of the given record and also having the same value for that second parameter as in the given record, and these latter record numbers are stored in memory section TEMP-B. After this second search through table 14 has been completed, comparator means 56 compares the numbers in TEMP-A and TEMP-B, and the numbers that are in both TEMP-A and TEMP-B are listed in memory section TEMP-C. After this, transfer means 58 erases the list in memory section TEMP-A and transfers to that memory section the list formed in the memory section TEMP-C. This procedure is repeated for all of the parameters in the given record up to and including the second last parameter of that record.

For the last parameter in the given record, the above procedure is repeated except that it is not necessary to transfer to TEMP-A the list formed in TEMP-C because, at this point, the list formed in TEMP-C is a complete list of all the records in table 14, if any, having all the parameters in the given record and the respective values for those parameters.

Some, or perhaps all, of these listed records may include parameters not included in the given record; and in order to determine if table 14 includes a record that exactly matches the given record, it is necessary to search the records listed in TEMP-C for records having parameters not in the given record. First and second ordering means 60 and 62, first and second arrays 64 and 66, and comparator means 70 are used to do this.

The first ordering means arranges the parameters of the given record in the first array, referred to as ARRAY-A, and according to a given order; the second ordering means arranges the parameters of a first record listed in TEMP-C in the second array, referred to as ARRAY-B but also according to that given order; and comparator 70 compares this second array to the first array. If the two arrays are found to be different, then ARRAY-B is erased, the second ordering means arranges the parameters of the next record listed in TEMP-C in a new ARRAY-B, and comparator 70 compares this new ARRAY-B to ARRAY-A. This process is repeated for each of a series of records listed in memory section TEMP-C until either an ARRAY-B is found that is identical to ARRAY-A, or all the records listed in memory section TEMP-C have been searched without finding one that is identical to the given record.

Preferably, ARRAY-A consists of a series of consecutive rows, and the parameters of the given record are arranged in that array in alphabetical order, with one parameter per row; and, similarly, ARRAY-B consists of a series of consecutive rows, and the parameters placed therein are arranged in alphabetical order, also with one parameter per row. With this preferred arrangement, the two arrays are compared by comparing the parameters in corresponding rows of the two arrays, and the comparison of the ARRAY-A with a particular ARRAY-B is terminated when a parameter in a row of that ARRAY-B is found that is different than the parameter in the same row of ARRAY-A. Also, with this preferred embodiment, the search for a record identical to the given record is itself ended when the parameter of each row of a particular ARRAY-B has been found to be identical to the parameter in the same row of ARRAY-A.

Figure 8:
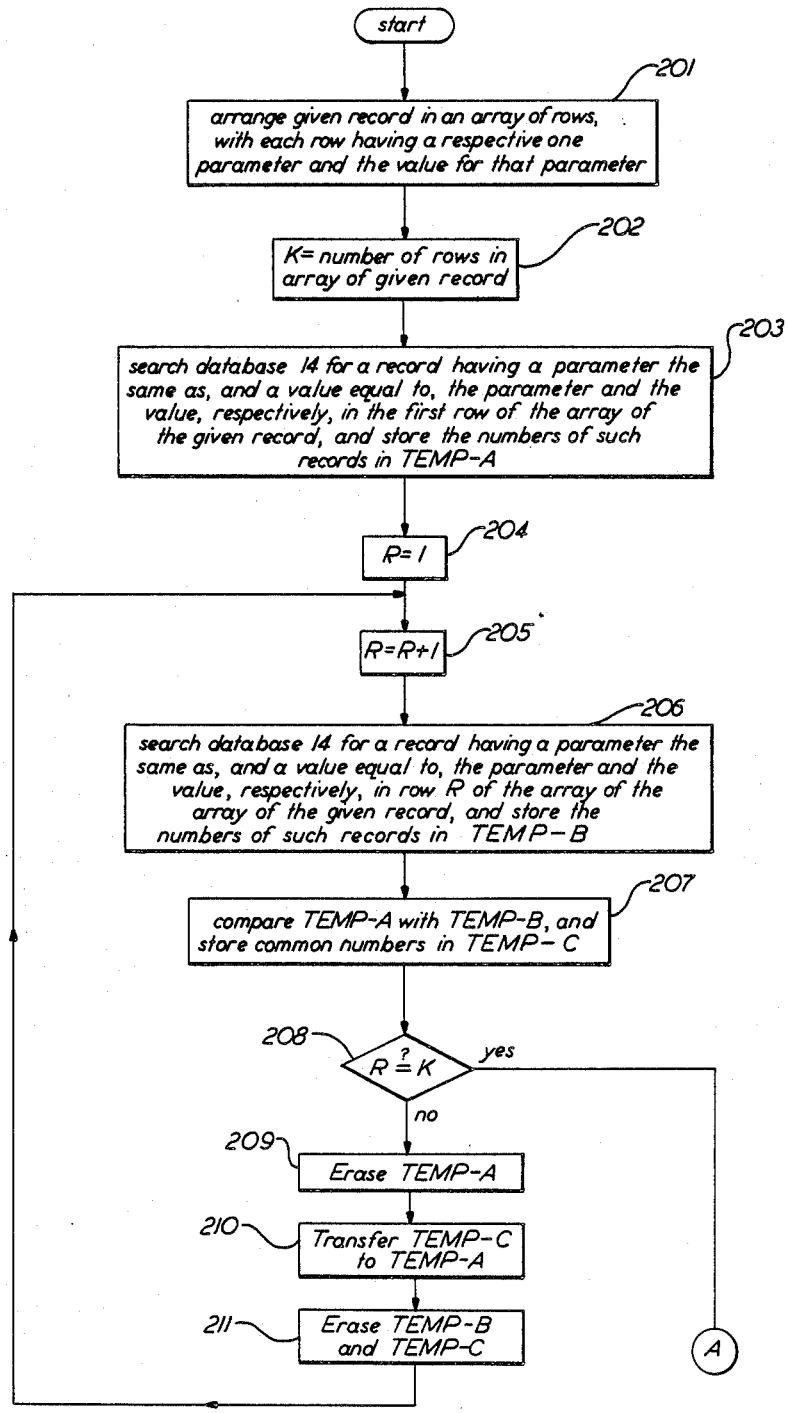
FIGS. 8 and 9 show a simplified flow chart illustrating a procedure to operate the system shown in FIG. 7.

FIG. 8 shows the first half of a flow chart illustrating one procedure for searching database table 14 for a record identical to a given record. This half of the flow chart involves two variables, K and k. K is an internal variable set equal to the total number of parameters in the given record, and k is an internal variable that keeps track of the number of those parameters for which table 14 has been searched.

At step 201, the parameters of the given record are arranged in an array of rows, with each row having a respective one parameter and the value for that parameter, for example as shown in FIG. 7; and at step 202, K is set equal to the number of rows in the array. Then, at step 203, table 14 is searched for a record having a parameter the same as, and a value equal to, the parameter and value in the first row of the given record, and the numbers of such records are stored in TEMP-A. Next, at step 204, k is set equal to one, and then at step 205 k is increased by one. At step 206, table 14 is searched for a record having a parameter the same as, and a value equal to, the parameter and the value, respectively, in row k of the array formed by the given record, and all of these record numbers are stored in TEMP-B.

After this, at step 207, the list in TEMP B is compared with the list TEMP-A, and the record numbers that are on both lists are stored in TEMP-C. At step 208, K is compared to K, and if k is not equal to K, the list in TEMP-A is erased at step 209, the list in TEMP-C is transferred to TEMP-A at step 210, and TEMP-B and TEMP-C are erased at step 211. The procedure returns to step 205, and steps 205–210 are repeated until k becomes equal to K. Once k becomes equal to K at step 208, the procedure moves to the chart shown in FIG. 9. At this point, a first pass through table 14 is completed, and TEMP-C contains a list of all the numbers of records in table 14 having all the parameters, and their respective values, in the given record.

Figure 9:
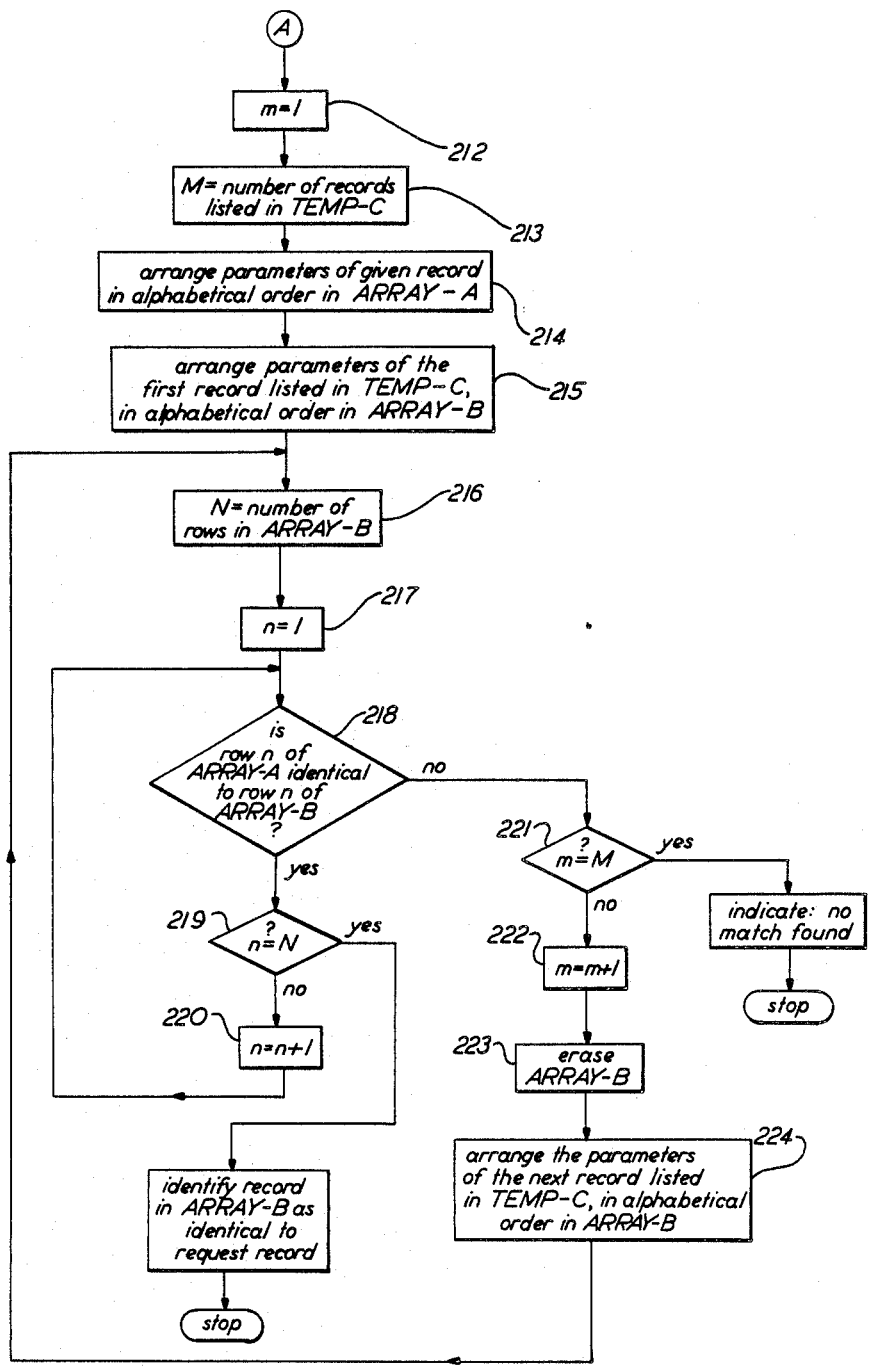

As previously mentioned, many or all of these records listed in TEMP-C may have parameters that are not in the given record set, and FIG. 9 illustrates a procedure to search through the records listed in TEMP-C for an exact match with the given record.

The flow chart shown in FIG. 9 involves four internal variables m, n, M and N. M is set equal to the number of records listed in TEMP-C after the above-mentioned first pass has been completed through database 14, and m keeps track of the number of these records that have been compared to the given record. N is set equal to the total number of parameters in the record listed in TEMP-C that is under consideration at any particular time, and n keeps track of the number of parameter in that record for which the given record has been searched.

At step 212, m is set equal to one, and then at step 213, M is set equal to the number of records listed in TEMP-C. The parameters of the given record are, at step 214, arranged in alphabetical order in an array of rows, identified as Array-A; and at step 215, the parameters of the first record listed in TEMP-C, are arranged in alphabetical order in a second array of rows, referred to as Array-B. N is set equal to the number of rows in Array-B at step 216, and n is set equal to one at step 217. Then, at step 218, row n of Array-A is compared to row n of Array-B. If these two rows are the same, n is compared to N at step 219. If n is not equal to N, then n is increased by one at step 220, and the program loops back to step 218. Steps 218, 219 and 220 are repeated for as long as the rows of Array-A are the same as the rows of Array-B. If n eventually becomes equal to N, this indicates that all the rows of Array-B have been compared to rows in Array-A, and a one-to-one match has been found between the rows of the arrays. The record of table 14 that was used to form that Array-B is identical to the requested record, and this record of table 14 is identified as such.

If, during the comparison of Array-A and Array-B, a parameter in a row of the latter array is found that is different than the parameter in the same row of the former array, then the flow chart illustrated in FIG. 9 moves on to step 221, and m is compared to M. If m is not equal to M, m is increased by one at step 222, Array-B is erased at step 223, and the parameters of the next record listed in TEMP-C are now arranged in alphabetical order in Array-B. The program then loops back to step 216, N is reset equal to the number of rows in the new Array B, n is reset to one, and the program proceeds through steps 217-220 to compare Array-B to Array-A, one row at a time. If at step 221, m is equal to M, this indicates that all the records listed in TEMP-C have been compared to the given record, and no match has been found and this is indicated to the user.

As will be understood by those of ordinary skill in the art, database table 14 is very well suited to assist a user search for records of indefinite or variable length. The format of table 14 does not require that the same, fixed number of rows be allocated to each record, while in contrast, the format of table 40 requires that the same fixed number of columns be allocated to each record even though many columns might not be used in many records. New records can be continuously added to table 14, and it is not necessary to adjust the column or row length of any previously stored records even if the length of the new record exceeds the length of the longest prior stored record. Moreover, regardless of the number of data items in the records stored in table 14, the table has a fixed number of columns.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. A knowledge system to determine a machine configuration of a given type from a requested machine configuration, each machine configuration having a record including a plurality of parameters, taken from a given family of parameters, and a value for each of said plurality of parameters, the knowledge system comprising:
   an expert system to process the record of the requested machine configuration to determine therefrom a machine configuration of the given type;
   a complementary database storing a plurality of records of machine configurations of the given type, all of the values for each one of the parameters of the records stored in the complementary database forming a value set associated with said one parameter;
   search means to search the complementary database for a record identical to the record of the requested machine configuration, and to indicate to a requestor that the requested machine configuration is of the given type if a record identical to the record of the requested machine configuration is found in the complementary database, and including means to search all of the value sets associated with the parameters of the record of the requested machine configuration, one value set at a time, for all of the values in each value set identical to the value of the associated parameter of the record of the requested machine configuration; and
   input means to receive from the requestor the record of the requested machine configuration, and to transmit the record thereof to the search means.

2. A knowledge system according to claim 1, further including means to invoke the expert system to process the record of the requested machine configuration only when no record identical to the record of the requested machine is found in the complementary database.

3. A knowledge system according to claim 1, wherein:
   the system further includes means to transmit to the complementary database from the expert system records of machine configurations of the given type and determined by the expert system; and
   the complementary database includes means to store the records of machine configurations transmitted to the complementary database from the expert system.

4. A knowledge system according to claim 3, wherein the means to transmit includes control means to transmit to the complementary database from the expert system, only the records of machine configurations determined by the expert system to be machine configurations of the given type.

5. A knowledge system to answer a specific request from a requestor, each request having a record including a plurality of parameters, taken from a given family of parameters, and a value for each of said plurality of parameters, the knowledge system comprising:
   an expert system to process the record of the specific request to provide an answer to the request;
   a complementary database storing a plurality of records of requests having known answers, all of the values for each one of the parameters of the records stored in the complementary database forming a value set associated with said one parameter;
   searching means to search the complementary database for a record identical to the record of the specific request, and if an identical record is found, to provide to the requestor, the known answer to the request having said identical record, and including means to search all of the value sets associated with the parameters of the record of the specific request, one value set at a time, for all of the values in each value set identical to the value of the associated parameter of the specific request; and
   input means to receive from the requestor the record of the specific request, and to transmit the record thereof to the search means.

6. A knowledge system according to claim 5, further including means to invoke the expert system to process the record of the specific request only when no record identical to the record of the specific request is found in the complementary database.

7. A knowledge system according to claim 5, wherein:
   the system further includes means to transmit to the complementary database from the expert system, records of answers determined by the expert system; and
   the complementary database includes means to store the records transmitted to the complementary database from the expert system.

8. A knowledge system according to claim 7 wherein the means to transmit includes control means to transmit to the complementary database from the expert system, the records of only selected answers.

9. A method for operating a knowledge system to determine a machine configuration of a given type from a requested machine configuration, each machine configuration having a record including a plurality of parameters, taken from a family of parameters, and a value for each of said plurality of parameters, the knowledge system including an expert system and a complementary database, the method comprising the steps of:
   storing in the complementary database, a plurality of records of machine configurations of the given type, all of the values for each one of the parameters of the records stored in the complementary database forming a value set associated with said one parameter;

searching the complementary database for a record identical to the record of the requested machine configuration, including the step of searching all of the value sets associated with the parameters of the record of the requested machine configuration, one value set at a time, for all of the values in each value set identical to the value of the associated parameter of the record of the requested machine configuration;

indicating to a requestor that the requested machine configuration is a machine configuration of the given type if a record identical to the record of the requested machine configuration is found in the complementary database, and when no record identical to the record of the requested machine configuration is found in the complementary database, invoking the expert system to process the record of the requested machine configuration to determine therefrom a machine configuration of the given type.

10. A method according to claim 9, wherein the invoking step includes the step of invoking the expert system to process the record of the requested machine configuration only when no record identical to the record of the requested machine configuration is found in the complementary database.

11. A method according to claim 9, further including the step of adding to the complementary database records of machine configurations determined by the expert system to be machine configurations of the given type.

12. A method for operating a knowledge system to answer a specific request, each request having a record including a plurality of parameters, taken from a given family of parameters, and a value for each of said plurality of parameters, the knowledge system including an expert system and a complementary database, the method comprising the steps of:

storing in the complementary database, a plurality of records of requests having known answers, are of the values for each one of the parameters of the records stored in the complementary database forming a value set associated with said one parameter;

searching the complementary database for a record identical to the record of the specific request, including the step of searching all of the value sets associated with the parameters of the record of the specific request, one value set at a time, for all of the values in each value set identical to the value of the associated parameter of the record of the specific request;

if a record identical to the record of the specific request is found in the complementary database, providing to a requestor the known answer to the request having said identical record; and when no record identical to the record of the specific request is found in the complementary database, invoking the expert system to process the record of the specific request to answer the specific request.

13. A method according to claim 12, wherein the invoking step includes the step of invoking the expert system to process the record of the specific request only when no record identical to the record of the specific request is found in the complementary database.

14. A method according to claim 12, further including the step of adding to the complementary database the records of selected answers determined by the expert system.

* * * * *

UNITED STATES PATENT AND TRADEMARK OFFICE
CERTIFICATE OF CORRECTION

PATENT NO. : 4,884,218

DATED : November 28, 1989

INVENTOR(S) : Palmer W. Agnew, et al.

It is certified that error appears in the above-identified patent and that said Letters Patent is hereby corrected as shown below:

Col. 10, line 10:  the first occurrence of "K" should read as --k--

Col. 14, line 6:   "are" should read as --all--

Signed and Sealed this

Fourth Day of June, 1991

*Attest:*

HARRY F. MANBECK, JR.

*Attesting Officer*    *Commissioner of Patents and Trademarks*